US009016974B2

(12) United States Patent
Coote

(10) Patent No.: US 9,016,974 B2
(45) Date of Patent: Apr. 28, 2015

(54) COUPLING DEVICE

(75) Inventor: Clive Coote, Barnet (GB)

(73) Assignee: Vertical Leisure Ltd, Hertfordshire (GB)

( * ) Notice: Subject to any disclaimer, the term of this patent is extended or adjusted under 35 U.S.C. 154(b) by 329 days.

(21) Appl. No.: 13/339,767

(22) Filed: Dec. 29, 2011

(65) Prior Publication Data
US 2013/0005538 A1 Jan. 3, 2013

Related U.S. Application Data

(63) Continuation of application No. PCT/EP2010/058635, filed on Jun. 18, 2010.

(30) Foreign Application Priority Data

Jul. 2, 2009 (GB) .................................. 0911495.0

(51) Int. Cl.
*F16B 7/04* (2006.01)
*A63B 26/00* (2006.01)
*A63B 9/00* (2006.01)
(Continued)

(52) U.S. Cl.
CPC .............. *F16B 7/042* (2013.01); *Y10T 403/557* (2015.01); *A63B 9/00* (2013.01); *A63B 21/00047* (2013.01); *A63B 21/1681* (2013.01); *A63B 2210/50* (2013.01); *A63B 2244/225* (2013.01); *A63B 26/00* (2013.01); *F16B 7/0413* (2013.01)

(58) Field of Classification Search
CPC ....... F16B 7/0406; F16B 7/0413; A63B 9/00; A63B 26/00; A63B 26/003

USPC ........... 403/109.4, 109.5, 109.6, 43, 48, 292, 403/294, 297, 377, 378, 379.1, 379.3, 403/379.6; 482/33, 907
See application file for complete search history.

(56) References Cited

U.S. PATENT DOCUMENTS

| 2,618,675 A | 11/1952 | Lallmang |
| 2,952,484 A | 9/1960 | Zoltok |

(Continued)

FOREIGN PATENT DOCUMENTS

| CN | 2924122 Y | 12/2001 |
| CN | 201031835 Y | 3/2008 |

(Continued)

OTHER PUBLICATIONS

"X-Pole: Professional Portable Exercise & Dance Pole," X-Pole leaflet2.indd, Vertical Leisure Ltd., Oct. 11, 2005, pp. 1-8.
(Continued)

*Primary Examiner* — Michael P Ferguson
(74) *Attorney, Agent, or Firm* — EIP US LLP

(57) ABSTRACT

A coupling device releasably couples tubes of a pole dancing pole. The coupling device includes a body, and a mechanism comprising a first threaded element and a screw member mating with each other, the mechanism being arranged to apply a force to an interior surface of at least one of the tubes by turning the screw member with respect to the first threaded element. The mechanism is further arranged such that, during operation of the mechanism to increase the force applied to the interior surface of at least one of the tubes, a screw axis of the first threaded element and a screw axis of the screw member remain substantially aligned with each other. Also disclosed is a pole dancing pole and a pole dancing pole kit including the coupling device.

17 Claims, 3 Drawing Sheets

(51) Int. Cl.
*A63B 21/00* (2006.01)
*A63B 21/16* (2006.01)

(56) References Cited

U.S. PATENT DOCUMENTS

| | | | |
|---|---|---|---|
| 2,997,317 | A | 8/1961 | Scott |
| 3,514,135 | A | 5/1970 | Cooper |
| 3,598,349 | A | 8/1971 | Drake |
| 3,829,824 | A | 8/1974 | Pillischafske |
| 4,440,518 | A | 4/1984 | Davlantes |
| 4,671,478 | A | 6/1987 | Schoenig et al. |
| 4,859,109 | A | 8/1989 | Targetti |
| 5,203,135 | A | 4/1993 | Bastian |
| 5,860,253 | A | 1/1999 | Lapointe |
| D561,274 | S | 2/2008 | Turner |
| 7,938,593 | B1 | 5/2011 | Young |
| 2002/0007612 | A1 | 1/2002 | Gierss |

FOREIGN PATENT DOCUMENTS

| | | | | | |
|---|---|---|---|---|---|
| CN | 101332605 | A | | 12/2008 | |
| DE | 37 37 171 | | * | 5/1989 | ............... F16B 7/04 |
| EP | 1160396 | A2 | | 12/2001 | |
| GB | 680049 | | * | 10/1952 | ............ F16B 7/0413 |
| GB | 2106212 | A | | 9/1982 | |
| GB | 2 142 110 | | * | 1/1985 | ............... F16B 2/04 |
| GB | 0713866.2 | | | 1/2009 | |
| GB | 2451095 | A | | 1/2009 | |
| JP | 53-053118 | | | 5/1978 | |
| JP | 59-108802 | | | 6/1984 | |
| JP | 3163206 | | | 7/1991 | |
| WO | 9221886 | | | 12/1992 | |

OTHER PUBLICATIONS

International Search Report issued Jan. 25, 2011 on related application PCT/EP2010/058635 filed Jun. 18, 2010.
International Preliminary Report on Patentability issued Jan. 12, 2012 on related application PCT/EP2010/058635 filed Jun. 18, 2010.
"If you click the yellow button, I'll give you a COOKIE!", Human Flag Tutorial , https://www.youtube.com/watch?v=JAMVGZZeWc0, Uploaded on Jun. 29, 2009.
Japanese Patent Office, Notice of Reasons for Rejection, dispatched by Examiner on Mar. 4, 2014 relating to Patent Application No. P2012-516668.

* cited by examiner

COUPLING DEVICE

FIELD OF THE INVENTION

The present invention relates to a coupling device and in particular to a coupling device for pole dancing poles.

BACKGROUND OF THE INVENTION

Poles for use in dance exercise, or pole dancing, have become very popular in recent years. Such poles extend between floor and ceiling and generally comprise at least two tubes connected together in series according to the height required. The poles may be erected and dismantled by coupling or decoupling the tubes. To facilitate coupling and decoupling, joints are provided between the tubes. There are presently two forms of joint used, screw joints and insert joints, both of which suffer from drawbacks.

Screw joints are expensive to manufacture, since they require an insert to be welded into the end of a tube and a finishing operation. During use, when a pole becomes warm, the tubes and joint can expand so that the screw threads become locked together and it is difficult to unscrew the joint after use of the pole. Alternatively, the screw joint can be unscrewed during use by anti-clockwise rotation if it is not sufficiently tight.

Insert joints must be smaller than the tubes into which they are inserted, accordingly they are prone to movement within the tubes, which results in flexing of the pole and/or relative rotation of the tubes during use. Furthermore, when a pole becomes warm during use the insert can expand causing the tubes to become locked together and difficult to separate.

Coupling devices having a body that radially expands are also known for joining tubes together, for example from UK patent application no. 0713866.2. However, such coupling devices can be difficult to operate as during operation moving parts can become misaligned thereby preventing the body from expanding correctly. This provides the problem that a user may believe that the coupling device is properly engaged with the tubes, for example because a screw of the moving parts become difficult to turn, when in fact this in not the case and can result in a potential hazard for the user.

The present invention sets out to provide an improved coupling device for a pole dancing pole that overcomes the problems of the prior art.

SUMMARY OF THE INVENTION

In accordance with a first aspect of the present invention, there is provided a coupling device for releasably coupling tubes of a pole dancing pole, the coupling device comprising:
a body; and
a mechanism comprising a first threaded element and a screw member mating with each other, said mechanism being arranged to apply a force to an interior surface of at least one of said tubes by turning said screw member with respect to said first threaded element,
wherein said mechanism is arranged such that, during operation of the mechanism for increasing the force applied to the interior surface of the at least one of said tubes, a screw axis of said first threaded element and a screw axis of said screw member remain substantially aligned with each other.

The present invention provides a coupling device that maintains a sufficient axial alignment of the screw member with respect to the first threaded element for maintaining a required clearance between the threads of the first threaded element and screw member to prevent the threads from jamming due to misalignment.

A screw axis is an axis along which a translation occurs and about which a rotation occurs. The screw axis of the first threaded element is the axis which the screw member translates along and rotates about when the first threaded element is turned with respect to the screw member. The screw axis of the screw member is the axis which the first threaded element translates along and rotates about when the screw member is turned with respect to the first threaded element.

If thread portions of the first threaded element and screw member were to become misaligned this could cause the threads to lock against one another and thereby limit the ability to fully tighten the screw member of the coupling device to apply sufficient force to the interior surface of the tubes. To avoid this problem, the present invention therefore advantageously maintains substantial alignment of the screw axis of the first threaded element and the screw axis of the screw member so that the screw member can freely rotate within the threaded element without jamming. Therefore, the term substantially aligned used herein means that the screw axis of the first threaded element and the screw axis of the screw member are aligned at least to the extent necessary to avoid jamming between the screw member and the first threaded element which would prevent correct operation of the mechanism for the coupling device to couple two tubes together.

This advantage is of particular importance for pole dancing poles that are intended to be assembled and disassembled relatively quickly and easily by the user. The present invention therefore prevents a user under-tightening a screw member for coupling two tubes together, and therefore provides for assembly of a sturdy and safe pole dancing pole.

The first threaded element may comprise a surface adapted to contact an interior surface of the body, the surface of the first threaded element being arranged to apply a force against said interior surface for applying the force to the interior surface of the at least one of said tubes. This advantageous arrangement allows the coupling device to be used to provide a frictional joint for coupling tubes of a pole dancing pole together.

The first threaded element may be coupled to the interior surface of the body by at least one fastener adapted to allow the first threaded element to orientate itself with respect to the interior surface of the body. This arrangement allows the first threaded element to float, i.e. the first threaded element is not fixed rigidly to the body, thereby enabling the first threaded element to orientate itself with respect to a configuration of the interior surface of the body when applying a continuously increasing force to the body of the coupling device, by operating the screw member in the first threaded element, to expand the coupling device. This orientation of the first threaded element with respect to the body may assist the screw axis of the first threaded element and the screw member to remain substantially aligned with each other. This orientation may occur even if the interior surface of the body does not move, when expanding the body, in a direction perpendicular the screw axis of the first threaded element. Such non-perpendicular movement may be caused by the body having slots which, when expanding the body using the mechanism, may expand to a greater extent towards an end of the body than an extent of expansion towards a longitudinal centre of the body. Such embodiments of the present invention are advantageous compared with the prior art; in a prior art coupling device where a threaded member is fixed rigidly to a body of the coupling device, movement of the interior surface of the body which is not perpendicular a screw axis of a screw member may cause the screw member to become misaligned with a screw axis of the threaded element, and therefore jammed.

The at least one fastener may be adapted to expand a portion of the body when turning the screw member in one direction with respect to the first threaded element and to contract the portion of the body when turning the screw in an opposite direction with respect to the first threaded element. Arranging the coupling device to be able to contract the body avoids the possibility of the joint becoming stuck in a portion of the tube due to a lack of elasticity of the body.

In an embodiment of the present invention the at least one fastener comprises a screw fastened in said first threaded element, through a hole of said body, said screw having an unthreaded portion for allowing the threaded element to move with respect to the interior surface of the body. The unthreaded portion may therefore not be fixed to the body.

The body may comprise at least one slot extending along at least part of a longitudinal axis of said body and the mechanism is operable to expand and contract the slot. Thus, the body may be easily expanded and contracted.

Advantageously, the at least one slot may extend along the entire length of the body. This arrangement allows the joint to expand uniformly along the entire length of the joint, thereby applying evenly along the joint a force against the interior surface of tubes being coupled. This arrangement advantageously reduces and preferably eliminates flexing movement between the ends of the two tubes abutting when coupled by the coupling device, thus providing for a sturdy and safe pole dancing pole when assembled.

Preferably, the mechanism comprises a second threaded element having a thread direction opposite a thread direction of the first threaded element. This advantageously allows a force to be applied to opposite sides of the body, to provide an even expansion of the body, and therefore an even application of force to the interior surface of at least one tube.

In one embodiment of the present invention the coupling device may comprise a second mechanism arranged to apply a force to an interior surface of at least one of said tubes by turning said screw member with respect to said first threaded element. In this way, one mechanism may be used to couple one end of the coupling device to one tube, and the second mechanism may be used to couple the other end of the coupling device to another tube.

The body may comprise a first longitudinal slot at one end of the body and a second longitudinal slot at the other end of the body, and one of said mechanisms is arranged to expand said first longitudinal slot and the other of said mechanisms is arranged to expand said second longitudinal slot. In alternative embodiments, where the body comprises a single longitudinal slot along the length of the body, one mechanism may be used to expand the body, or two mechanisms may be arranged to expand the body evenly along the length of the body.

The outer surface of the body may comprise at least one through hole, so that the screw member may be accessed with a tool for turning the screw member.

According to another aspect of the present invention there is provided a pole dancing pole comprising the coupling device in accordance with the first aspect of the present invention and a first and a second tube.

The body may comprise on its outer surface, in a longitudinal central region, at least one radially extending location pin, and the first and second tubes each comprise in their end faces at least one notch adapted to receive the at least one location pin.

The first and second tubes may each comprise a hole which, with the coupling device arranged inside an end of the first and second tubes, is aligned with the at least one through hole for turning the screw members with a tool.

According to a third aspect of the present invention there is provided a pole dancing pole kit comprising the coupling device in accordance with the first aspect of the present invention; and a first and a second tube each having an end arranged to receive part of the coupling device.

Further features and advantages of the invention will become apparent from the following description of preferred embodiments of the invention, given by way of example only, which is made with reference to the accompanying drawings.

DETAILED DESCRIPTION OF THE INVENTION

Figure 1:
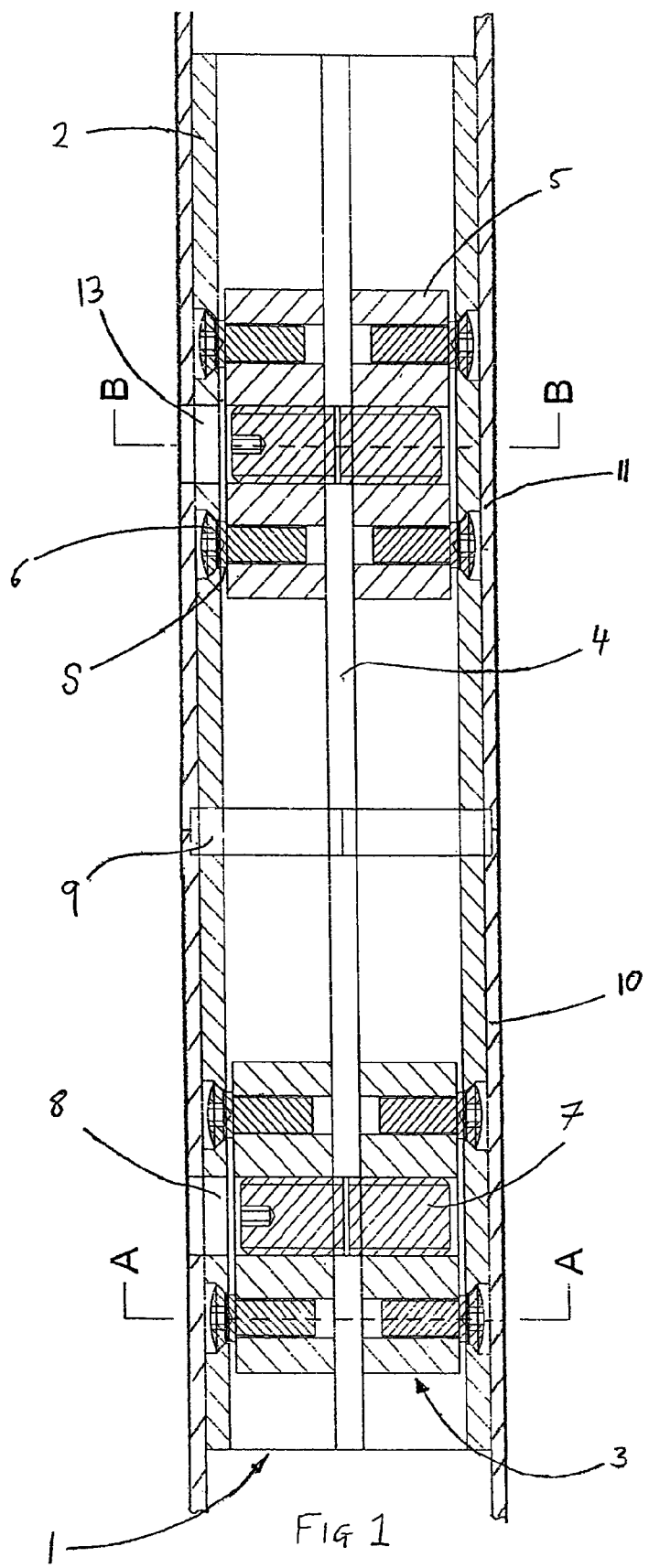
FIG. 1 shows a cross-section of a coupling device, according to a first embodiment of the present invention.

A coupling device 1 in accordance with an embodiment of the present invention is shown in FIG. 1 which comprises a body 2, which is a hollow cylindrical tube, and two mechanisms 3 comprising a first threaded element 5 and a screw member 7 mating with each other and which are operable to radially expand and contract the coupling device 1 by turning the screw member with respect to the first threaded element. The mechanism is arranged such that during operation of the mechanism for increasing the force applied to an interior surface of a tube, a screw axis of the threaded member and a screw axis of the screw member remain substantially aligned with each other. In an expanded state the coupling device 1 forms a friction joint with tubes 10, 11 securing them relative to each other.

The cylindrical body 2 is provided with a single longitudinally extending slot 4, extending the length of the body 2. The slot 4 allow the diameter of the cylindrical body 2 to be increased or decreased along its entire length by the mechanisms 3, which increase or decrease the width of the slot 4 by the application of expansive or contractive forces on circumferentially opposed points of the cylindrical body 2.

Figure 2:
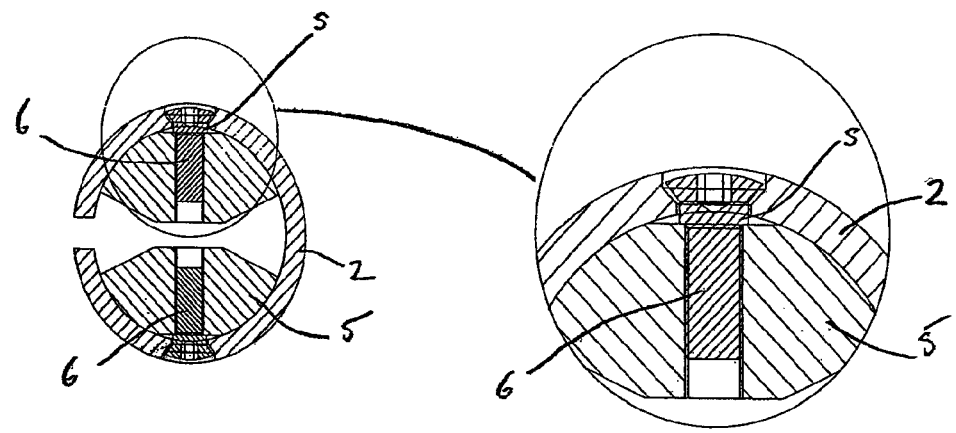
FIG. 2 shows a cross-section of the coupling device through line A-A of FIG. 1.

Referring to FIG. 2, each of the mechanisms 3 in this embodiment comprises first and second internally threaded elements 5, the second threaded element having a threaded direction opposite a thread direction of the first threaded element and the screw member 7. The threaded elements are each coupled to the inner face of the cylindrical body 2 by in this example two countersunk screws 6. Each countersunk screw 6 is provided with a shoulder S that allows movement of the threaded element 5 with respect to an interior surface of the cylindrical body 2. The shoulder S on the screw 6 enables the threaded element 5 to orientate itself so that the threaded portion of the element and the threaded portion of the screw member 7 stay aligned and thereby prevents jamming of the threads when the threaded element comes into contact with the interior surface of the cylindrical body when exerting a force to expand the cylindrical body. The shoulder S on the screw 6 enables movement of the shoulder into and out of a countersunk aperture in the cylindrical body through which the screw 6 passes and which enables each of the threaded elements to be self aligning. The countersunk aperture is arranged in preferred embodiments to be slightly oversized with respect to the diameter of the countersunk screw 6, thereby allowing free movement of the screw 6 and associated threaded element connected thereto when exerting a force to expand the cylindrical body.

Figure 3:
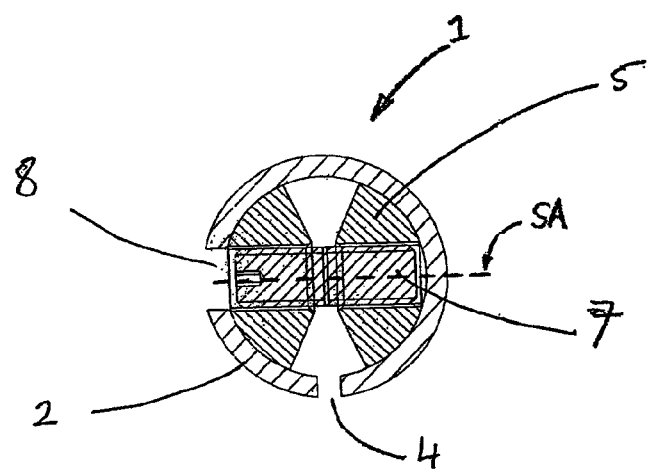
FIG. 3 shows a cross-section of the coupling device through line B-B of FIG. 1.

An outer surface of each threaded element 5 preferably conforms to the inner face of the cylindrical body, as shown in FIG. 3. As shown, in this embodiment, each of the threaded elements is a block. The first and second threaded elements have axially aligned opposite threads that receive the screw member 7. That is one threaded element has a right hand thread and the other threaded element has a left hand thread in this embodiment. The screw member 7 has a single external thread and lies entirely within the profile of the cylindrical body 2. Access to the head of the screw member 7, through the outer surface of the cylindrical body 2, is provided by a through hole 8, which allows a user to turn the screw member 7 using a hand tool such as a screwdriver, Allen/Hexagon driver or similar. Since the first and second threaded elements 5 have opposite threads, rotation of the screw member 7 in one direction will draw the first and second threaded elements 5 towards one another, contracting the slot 4, and rotation of the screw member 7 in the other direction will push the first and second threaded elements 7 apart, expanding the slot 4. The longitudinal axis of the screw member 7 is orthogonal to the slot 4, as clearly shown in FIG. 3.

Referring to FIG. 1, the cylindrical body 2 is provided on its outer surface, in a longitudinal central region, with a radially extending location pin or pins 9. Each pin 9 extends from within the cylindrical body 2 through a hole provided in the outer surface of the cylindrical body 2. Each pin 9 extends beyond the outer surface of the cylindrical body 2 by a distance that is preferably less than the wall thickness of each of the first and second hollow tubes 10, 11, so that each pin can remain beneath the surface of the outer wall of the first and second tubes when the coupling device couples poles together, as shown in FIG. 1. The pin may be, for example, cylindrical or cuboid. Each of the first and second tubes is provided with a notch in its end face that is adapted to receive the pin or pins 9. The notch in each tube may be, for example, semi-circular and receive half of the circumference of the pin 9. The notch in each tube 10, 11 may be arranged to extend from an inner surface of the tubes 10, 11 into but not totally through the wall of the tubes so that when the end faces of the tubes 10, 11 abut each other, and the outer surfaces of the tubes 10, 11 lie flush, the pole is provided with a continuous smooth outer surface. When the tubes 10, 11 are connected together by the coupling device 1, the notch in each tube receives a portion of the pin 9 and thereby prevents rotation of the tubes 10, 11 with respect to each other. In a preferred embodiment of the invention the pin or pins 9 may extend across and through the entire diameter of the cylindrical body so as to protrude at circumferentially opposite sides of the cylindrical body, as illustrated in FIG. 1. This provides the advantage of providing two pins in the coupling device that when assembled with the tubes 10, 11 prevent rotation of the two tubes with respect to one another when coupled together by the coupling device.

The tubes 10, 11 are further provided with holes 13 that provide access to the screw members 7, through holes 8, for expanding and contracting the slot 4. The pin is operable to prevent the coupling element from sliding down within either of the tubes 10, 11 when it is inserted into the tubes 10, 11 and ensures alignment of the holes 8 and the holes 13, so that the screw members 7 may be accessed when the coupling device 1 is located within the tubes 10, 11 as shown in FIG. 1.

The operation of the coupling device 1 according to the present embodiment will now be described.

In order to couple together two tubes 10, 11, which form at least part of a pole dancing pole, the coupling device 1, in a contracted state, is inserted into the end of the first tube 10 and the location pin 9 is located within the notch of the first tube 10. With a tool, the screw member 7 of the first mechanism 3 is rotated and the threaded members located on the screw member move parallel with respect to each other, thus the screw axis SA of the screw member and the threaded elements are provided so that they are substantially aligned with each other, and in some embodiments preferably coincident with each other as illustrated in FIG. 3. As the outer surface of the threaded element contacts with the inner face of the cylindrical body the shoulder S on each of the screws 6 can move into the cylindrical body maintaining the preferable parallel movement of the threaded elements with respect to each other. As an increasing force is applied to the inner face of the cylindrical body to expand one end of the slot, this increases the diameter of the cylindrical body 2 at the first end and forming a friction joint with the first tube 10. Next, the portion of the coupling device 1 that is exposed from the end of the first tube 10 is inserted into the end of the second tube 11 and the location pin 9 is located within the notch of the second tube 11 with the ends of the first and second tubes 10, 11 brought into abutment. Finally, the screw member 7 of the second mechanism 3 is rotated to expand the other end of the slot 4, increasing the effective diameter of the cylindrical body 2 at the first end and forming a friction joint with the second tube 11. The tubes 10, 11 are coupled together to prevent relative axial or rotational movement.

Since the coupling device 1 is insertable into the ends of the tubes 10, 11 in a contracted state it is easy to insert, yet once inserted and expanded it provides a strong friction joint that prevents relative rotational and axial movement of the tubes 10, 11.

In order to de-couple the first and second tubes 10, 11 the screw member 7 of the mechanism 3 for coupling the body to the second tube 11 is rotated to contract the portion of the slot 4 associated with that mechanism, thereby reducing the diameter of the cylindrical body 2 and releasing the friction joint with the second tube 11 and allowing for removal of the coupling device 1 from the end of the second tube 11, thereby allowing for decoupling of the tubes 10, 11.

The coupling device 1 can remain within the end of the first tube 10 for the next time the tubes are to be coupled. Alternatively, the coupling device may be left in the second tube 11 and removed from the end of the first tube 10. Both screw members 7 can be operated for removal of the coupling device 1 from the ends of both tubes 10, 11.

Since the coupling device 1 is contracted prior to removal, even if it has heated up and expanded during use it is easy to remove.

Figure 4:
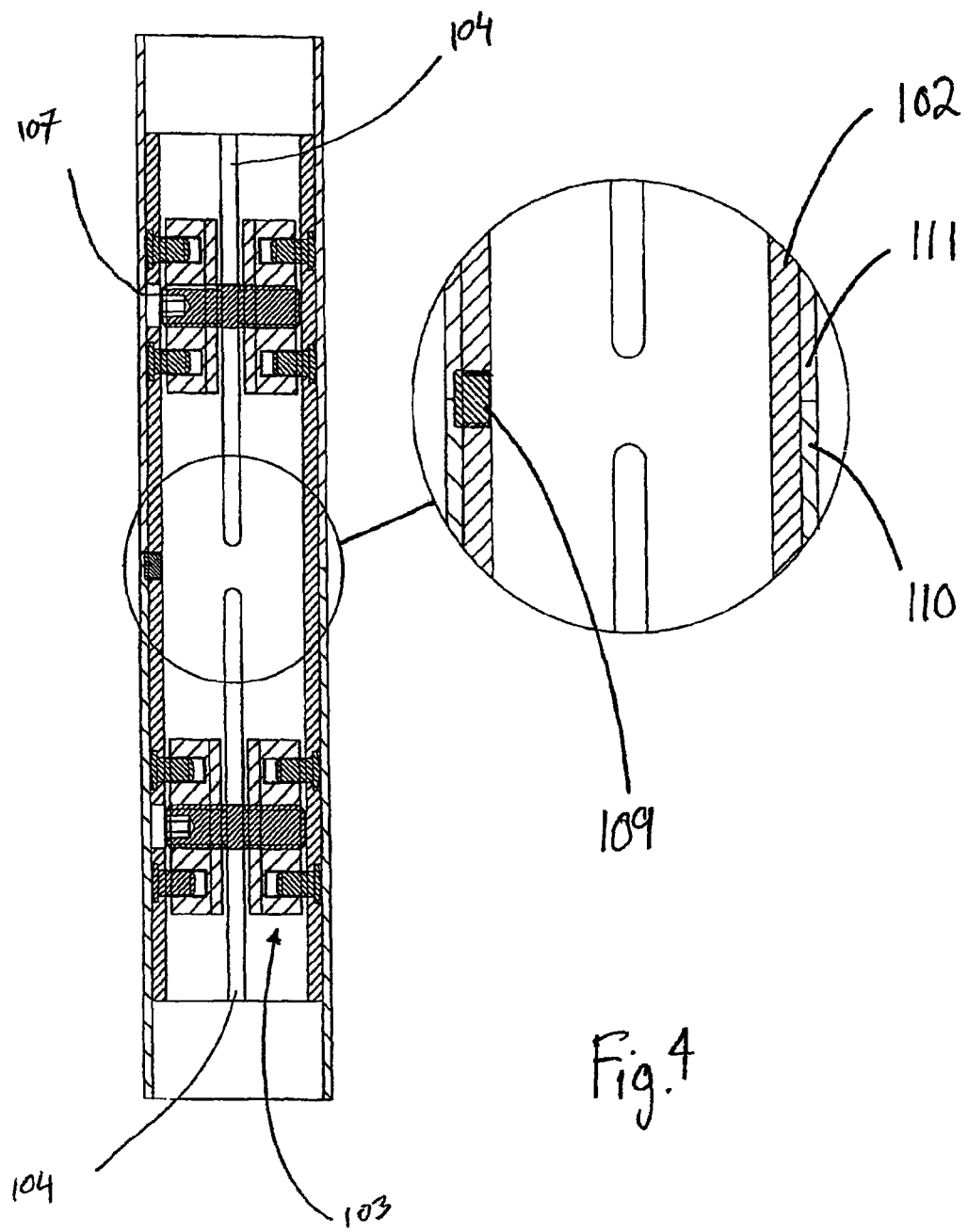
FIG. 4 shows a cross-section of a coupling device in accordance with a second embodiment of the present invention.

FIG. 4 shows a second embodiment of the invention. The second embodiment is the same as the above described embodiment referring to FIG. 1, the difference being the arrangement of the radially extending location pin 109, which protrudes from one side of the coupling device.

The pin 109 does not extend beyond the inner surface of the cylindrical body 102, and extends beyond the outer surface of the cylindrical body 102 by a distance that is less than the wall thickness of each of the first and second hollow tubes 110, 111. Each of the first and second hollow tubes 110, 111 is provided with a notch in its end face that is adapted to engage the pin 109. The notches are provided on the inner surfaces of the tubes 110, 111 and do not extend through the walls of the tubes 110, 111, they extend from the inner surfaces of the tubes 110, 111 by a distance that is substantially equal to the distance that the pin 109 protrudes from the outer surface of the cylindrical body 102. The notch in each tube may be, for example, semi-circular and engages half of the circumference of the pin 109. The end faces of the tubes 110, 111 abut each other, and the outer surfaces of the tubes 110, 111 lie flush, so that the pole is provided with a substantially continuous smooth outer surface. Since, the hollow tubes 110, 111 are not provided with notches that extend through their walls, but rather with internal notches, each tube is provided with a continuous outer surface.

In this embodiment there are two slots that extend, respectively, from a first and a second end of the coupling device and the two mechanisms 103 are provided one adjacent each end of the cylindrical body 102. By virtue of this arrangement, rotation of the upper (first) screw member 107 expands and contracts the first slot at the first end and rotation of the lower (second) screw member 107 expands and contracts the second slot at the second end.

The above embodiments are to be understood as illustrative examples of the invention. Further embodiments of the invention are envisaged. For example, whilst in the above embodiment two mechanisms are provided, there may alternatively be a single mechanism 3 or more than two mechanisms. For example, in the case where a single slot 4 is provided that extends along the entire length of the cylindrical body 2 there may be a single mechanism provided in a longitudinally central region of the cylindrical body 2. In a further simplified arrangement, the or each mechanism 3 may comprise a single internally threaded element 5, which is fixed to the inner face of the cylindrical body 2, and a screw member 7. In this case the screw member 7 will contact the inner face of the cylindrical body 2, such that turning the screw in one direction will expand the slot 4, by pushing the screw member 7 against the inner face of the cylindrical body 2, and turning the screw in the other direction will contract the slot 4, by retraction of the screw member and reduction of the pushing force on the inner face of the cylindrical body 2. In any of the described embodiments the mechanism need not be attached to the inner face of the cylindrical body 2 by screws, it may be fixed by riveting or similar. The arrangement of the pin 9, 109 and notches is not limited to a pin, it may comprise a woodruff key or similar. The pin may be, for example, a roll pin, a spiral pin, a screw or the like and there may be two or more pins located around the circumference of the coupling device. The pin 9, 109 may be arranged to have a depth that is the same depth as the wall of the tubes 10, 11 and the notches in the end faces of the tubes may extend through the entire wall of the tube.

As will be appreciated, the coupling device of the present invention may be used to couple tubes of a pole dancing pole. Such a pole dancing pole may comprise a base plate for engaging the pole dancing pole with a lower surface, such as a floor, and an upper plate for engaging the pole dancing pole with an upper surface, such as a ceiling. The pole dancing pole may also comprise an adjuster for extending the length of the pole dancing pole assembly to fix the pole dancing pole between the lower and upper surfaces. Thus the pole dancing pole may be provided as a kit for assembly.

The coupling device of the present invention may be used not only to couple tubes together but also to couple a tube to the base plate and/or upper plate, and/or further tubes for increasing the length of the pole dancing pole. Accordingly, a pole dancing pole assembly may comprise a plurality of the coupling device of the present invention.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A coupling device for releasably coupling tubes of a pole dancing pole, the coupling device comprising:
   a hollow body;
   a first mechanism within the hollow body, comprising a first threaded element and a first screw member configured to mate with the first threaded element, wherein the first mechanism is configured for applying a force against opposing interior surfaces of the hollow body, the opposing interior surfaces including a first interior surface of the hollow body, during turning the first screw member with respect to the first threaded element, the first mechanism thereby being configured to expand a portion of the hollow body for applying a force to a first interior surface of at least one of the tubes; and
   at least one fastener coupling the first threaded element to the first interior surface of the hollow body, the at least one fastener comprising:
   an inner portion fastening the at least one fastener to the first threaded element, and
   an outer portion coupling the at least one fastener to the first interior surface of the hollow body and configured to float relative to the first interior surface of the hollow body, the first mechanism thereby being configured to substantially maintain an alignment between a screw axis of the first threaded element and a screw axis of the first screw member during turning the first screw member with respect to the first threaded element,
   wherein the at least one fastener is located through a hole of the hollow body, the hole being sized for allowing the first threaded element to move with respect to the first interior surface of the hollow body.

2. A coupling device according to claim 1, wherein the first threaded element comprises a surface adapted to contact the first interior surface of the hollow body, the surface of the first threaded element being arranged for applying a force against the first interior surface of the hollow body for applying the force to the first interior surface of at least one of the tubes.

3. A coupling device according to claim 1, wherein the first threaded element is adapted to expand a portion of the hollow body during turning the screw member in one direction with respect to the first threaded element and to contract the portion of the hollow body during turning the screw member in an opposite direction with respect to the first threaded element.

4. A coupling device according to claim 3, wherein the at least one fastener comprises a screw having said inner portion and said outer portion, the outer portion of the screw having an unthreaded portion for allowing the first threaded element to move with respect to the first interior surface of the hollow body.

5. A coupling device according to claim 1, wherein the at least one fastener comprises a screw having said inner portion and said outer portion, the outer portion of the screw having an unthreaded portion for allowing the first threaded element to move with respect to the first interior surface of the hollow body.

6. A coupling device according to claim 1, wherein the hollow body comprises at least one slot extending along at least part of a longitudinal axis of the hollow body and the first mechanism is operable to expand and contract the slot.

7. A coupling device according to claim 6, wherein the at least one slot extends along the entire length of the hollow body.

8. A coupling device according to claim 1, wherein the first mechanism comprises a second threaded element having a thread direction opposite a thread direction of the first threaded element.

9. A coupling device according to claim 1, further comprising:
- a second mechanism within the hollow body, comprising a second threaded element and a second screw member configured to mate with the second threaded element,
- wherein the second mechanism is configured to apply a force to a second interior surface of the hollow body during turning the second screw member with respect to the second threaded element,
- wherein the second mechanism is further configured to substantially maintain an alignment between a screw axis of the second threaded element and a screw axis of the second screw member during turning the second screw member with respect to the second threaded element, and
- wherein the second threaded element is coupled to a second interior surface of the hollow body by at least one second fastener configured to allow the second threaded element to move with respect to the second interior surface of the hollow body.

10. A coupling device according to claim 9, wherein the hollow body comprises a first longitudinal slot at one end of the hollow body and a second longitudinal slot at the other end of the hollow body, wherein one of the first or second mechanisms is arranged to expand the first longitudinal slot and the other of the first or second mechanisms is arranged to expand the second longitudinal slot.

11. A coupling device according to claim 9, wherein an outer surface of the hollow body comprises at least one through hole configured to provide access to at least one of the first or second screw members.

12. A pole dancing pole, comprising:
- a first tube;
- a second tube;
- a coupling device configured to couple the first tube and the second tube, comprising:
  - a hollow body;
  - a mechanism within the hollow body, comprising a threaded element and a screw member configured to mate with the threaded element, wherein the mechanism is configured for applying a force against opposing interior surfaces of the hollow body, the opposing interior surfaces including a first interior surface of the hollow body, during turning the screw member with respect to the threaded element, the mechanism thereby being configured to expand a portion of the hollow body for applying a force to an interior surface of at least one of the first or the second tube; and
  - at least one fastener coupling the threaded element to the first interior surface of the hollow body, the at least one fastener comprising:
    - an inner portion fastening the at least one fastener to the threaded element, and
    - an outer portion coupling the at least one fastener to the first interior surface of the hollow body and configured to float relative to the first interior surface of the hollow body, the mechanism thereby being configured to substantially maintain an alignment between a screw axis of the threaded element and a screw axis of the screw member during turning the screw member with respect to the threaded element,
  - wherein the at least one fastener is located through a hole of the hollow body, the hole being sized for allowing the threaded element to move with respect to the first interior surface of the hollow body.

13. A pole dancing pole according to claim 12, wherein the hollow body comprises on an outer surface, in a longitudinal central region, at least one radially extending location pin, and the first and second tubes each comprise in their end faces at least one notch adapted to receive the at least one location pin.

14. The pole dancing pole of claim 13, wherein the first and second tubes each comprise a hole which, with the coupling device arranged inside an end of the first and second tubes, is aligned with a through hole in the hollow body configured to provide access to the screw member.

15. The pole dancing pole of claim 12, wherein the first and second tubes each comprise a hole which, with the coupling device arranged inside an end of the first and second tubes, is aligned with a through hole in the hollow body configured to provide access to the screw member.

16. The pole dancing pole of claim 12, wherein the first tube and the second tube each comprise an end configured to receive the coupling device.

17. A coupling device for releasably coupling tubes of a pole dancing pole, the coupling device comprising:
- a hollow body; and
- a first mechanism within the hollow body, comprising a first threaded element and a first screw member configured to mate with the first threaded element,
- wherein the first mechanism is configured to apply a force against opposing interior surfaces of the hollow body, the opposing interior surfaces including a first interior surface of the hollow body during turning the first screw member with respect to the first threaded element, the first mechanism thereby being configured to expand a portion of the hollow body for applying a force to a first interior surface of at least one of the tubes,
- wherein the first mechanism is further configured to substantially maintain an alignment between a screw axis of the first threaded element and a screw axis of the first screw member during turning the first screw member with respect to the first threaded element, and
- wherein the first threaded element is coupled to a first interior surface of the body by at least one fastener configured to allow the first threaded element to move with respect to the first interior surface of the body for applying the force against the first interior surface of the hollow body for applying the force to the first interior surface of at least one of the tubes,
- wherein the at least one fastener comprises a screw fastened in the first threaded element through a hole of the hollow body, the screw having an unthreaded portion for allowing the threaded element to move with respect to the first interior surface of the hollow body.

* * * * *